(12) United States Patent
Radigan

(10) Patent No.: US 6,772,128 B2
(45) Date of Patent: Aug. 3, 2004

(54) NUCLEAR DECOMMISSIONING INSURANCE FINANCIAL PRODUCT AND METHOD

(75) Inventor: Kenneth Radigan, East Northport, NY (US)

(73) Assignee: American International Group, Inc., New York, NY (US)

( * ) Notice: Subject to any disclaimer, the term of this patent is extended or adjusted under 35 U.S.C. 154(b) by 122 days.

(21) Appl. No.: 09/843,210

(22) Filed: Apr. 26, 2001

(65) Prior Publication Data

US 2003/0033171 A1 Feb. 13, 2003

Related U.S. Application Data

(60) Provisional application No. 60/267,376, filed on Feb. 7, 2001.

(51) Int. Cl.[7] .............................................. G06F 17/60
(52) U.S. Cl. ......................................................... 705/4
(58) Field of Search .............................. 705/1, 4, 36, 7; 283/54

(56) References Cited

U.S. PATENT DOCUMENTS

| 4,766,539 | A | * | 8/1988 | Fox ................................ 705/4 |
| 4,839,804 | A | * | 6/1989 | Roberts et al. ................ 705/36 |
| 5,873,066 | A | * | 2/1999 | Underwood et al. ........... 705/4 |

FOREIGN PATENT DOCUMENTS

WO        WO 9822899 A1  *  5/1998  ........... G06F/17/60

OTHER PUBLICATIONS

Warfel, Natural Disasters and Disruption in Property Insurance Markets: The Case for Federal Reinsurance, Spring 2000, CPC Journal, pp. 30–48.*

Kurland, Risk Mitigation in the Atomic Age, Jun. 1993, Risk Management, vol. 40 No. 6, pp. 34–45.*

Knowles, Nuke Plants Called Lesson in Safety, Oct. 1994, National Underwriter, vol. 98 No. 41, pp. 17–19.*

Price, Procedural Guidance on Treatment of Insurers Under CERCLA, Nov. 1985, United States Environmental Protectio Agency, pp. 1–61.*

"Decommissioning Nuclear Facilities", Uranium Information Center Ltd., Nuclear Issues Briefing Paper 13, Aug. 2000.

"Effects of Energy Deregulation on the Appropriate Method of Valuation of Generation Stations and Other Divested Property", Office of Real Property Services, Section 12.1.

* cited by examiner

Primary Examiner—Joseph Thomas
Assistant Examiner—Christopher L. Gilligan
(74) Attorney, Agent, or Firm—Proskauer Rose LLP

(57) ABSTRACT

An insurance policy and insurance method for providing financial assurance for decommissioning a nuclear power plant using insurance is described. In one embodiment, a financial product, such as a decommissioning insurance policy, provides financial assurance for the decommissioning of a nuclear power facility, and provides, in exchange for payment of a premium, for an insurer to pay actual decommissioning expenses for the nuclear power facility between a policy inception date and a policy termination date. In another embodiment, the insurance policy includes a premium that is based on an adjusted sum of costs and expenses that is equalized over a plurality of scenarios, where each scenario is based on the decommission starting, e.g., in a different year.

9 Claims, 3 Drawing Sheets

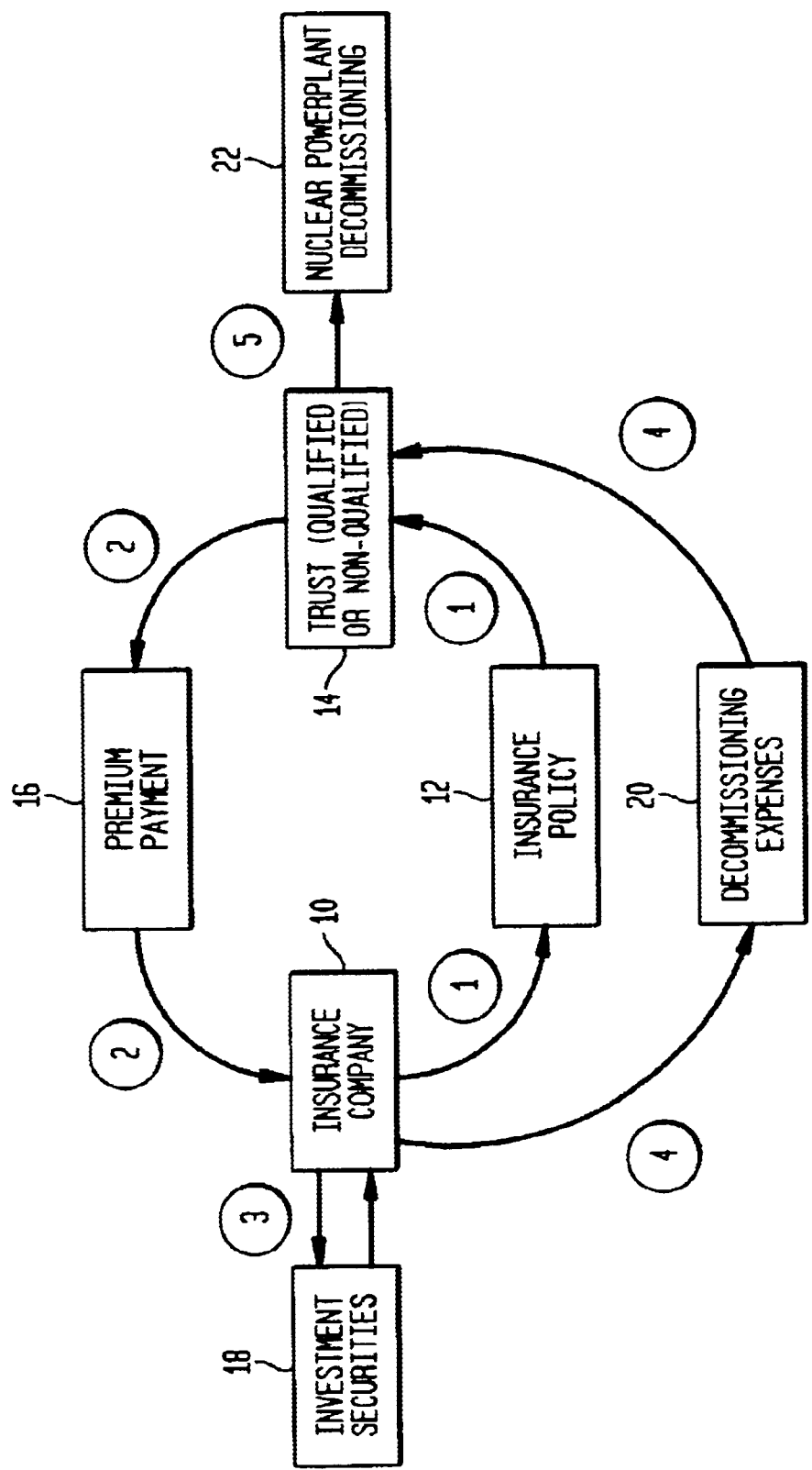

FIG. 2A

| | SCENARIO 1 | SCENARIO 2 | ... | SCENARIO N |
|---|---|---|---|---|
| 1) | $ _____ | | | |
| 2) | $ _____ | $ _____ | | |
| 3) | $ _____ | $ _____ | | |
| 4) | $ _____ | $ _____ | | |
| 5) | $ _____ | $ _____ | | |
| 6) | $ _____ | $ _____ | ... | |
| 7) | $ _____ | $ _____ | | |
| 8) | $ _____ | $ _____ | | |
| 9) | $ _____ | $ _____ | | |
| . | $ _____ | $ _____ | | |
| . | $ _____ | $ _____ | | |
| . | $ _____ | $ _____ | ... | |
| . | | $ _____ | | |
| N | | | | $ _____ |
| N + 1 | | | | $ _____ |
| N + 2 | | | | $ _____ |
| . | | | | $ _____ |
| . | | | | . |
| . | | | | . |
| . | | | | . |

NUCLEAR DECOMMISSIONING INSURANCE FINANCIAL PRODUCT AND METHOD

RELATED APPLICATION

This application is based upon provisional application Ser. No. 60/267,376, entitled "NUCLEAR DECOMMISSIONING INSURANCE," filed on Feb. 7, 2001 for Kenneth Radigan. The contents of this provisional application are fully incorporated herein by reference.

FIELD OF THE INVENTION

The present invention relates to a financial product and method for providing financial assurance for decommissioning a nuclear power plant using insurance. More specifically, the present invention relates to a financial product, such as a decommissioning insurance policy, and method for receiving premiums from a trust, investing the received premiums, and paying actual decommissioning expenses back to the trust in accordance with the decommissioning insurance policy. Further, the present invention relates to a financial product and method for determining the premium of the financial product.

BACKGROUND OF THE INVENTION

Nuclear Power Facilities and Licenses

The Nuclear Regulatory Commission ("NRC") sets requirements for the safe operation of commercial nuclear power reactors, licenses the construction and operation of the reactors, and inspects them to assure they are operating safely within the agency's regulations. According to the NRC, there are 103 operating nuclear power reactors at 65 sites. These plants use nuclear energy to generate electricity and generate approximately 22% of electricity in the United States. From the 103 operating plants, there are approximately 48 licensees, 4 reactor vendors, and 80 different nuclear power plant designs.

Commercial nuclear power plants are licensed by the NRC for a 40-year operating period with possible renewal of the license for an extended period of operation of up to 20 additional years. The last new license granted by the NRC was issued in 1978 and there are currently no new licensing requests. Further, the NRC is not expecting any new applications in the near future. However, in 1998 two plants, Calvert Cliffs and Oconee, have applied for and received a 20-year license renewal. Further, the NRC and other regulatory authorities may encourage the extension of nuclear power plants in order to meet air emission standards.

Unless license extensions are granted, all current licenses will expire by 2035, including Calvert Cliffs and Oconee whose extensions will expire in 2018. In particular, licenses for twelve plants will expire by 2011, and licenses for thirty-six plants will expire between 2011 and 2015. It should also be noted that the NRC may issue an order to a licensee to suspend or permanently cease operations if the licensee fails to operate the facility in accordance with the terms of the license.

Nuclear Value Chain—Nuclear Plants Considered as a Business

Due to low and steady variable costs, nuclear power plants provide long-term stability of total costs. This allows nuclear power plants to offer forward sales that capture a market premium which can be much more valuable than the margin from low current production costs.

In particular, when the electricity industry is considered as a business, the economic value of nuclear power plants can be defined in stages. The Nuclear Energy Institute ("NEI") refers to this analysis of economic value as the "nuclear value chain." The nuclear value chain includes:

Low production cost: The going forward cost of electricity from a nuclear power plant is clearly competitive when compared to the market clearing price of electricity in the day-ahead market. However, nuclear units have significantly more value than simply the price they receive for electricity in the wholesale market.

Improved performance: The industry can continue to achieve improved performance through increased rates, shorter refueling outages, higher fuel burn-ups, and better management of O&M costs.

Future price stability: Nuclear facilities can leverage its high degree of future price stability by selling at a premium to large users an assured source of electricity supply at a known price. For example, presently some users in California are willing to pay this premium to protect themselves against the damaging effects of price volatility in the day-ahead market.

Site value: Nuclear power plants have significant additional site value, such as switchyards, access to the power grid, ingress and egress, and spare cooling capacity. In many cases, nuclear power sites were planned for more units than were built, providing room to build additional non-nuclear generation. Such diverse generation would enable a single site to execute forward sales in the bilateral contract market and participate in the day-ahead market, in particular selling highly profitable 10-minute spinning reserve capacity.

Clean air compliance value: The substantial emissions avoided by the use of nuclear energy reduce the compliance obligation and associated costs for affected fossil-fueled power plants, including capital outlays to bring fossil-fueled plants into compliance.

Accordingly, based on the many advantages of nuclear power plants shown in the above nuclear value chain, the number of new nuclear power plants built, as well as the sale of existing plants, may increase.

Decommissioning

When nuclear facilities are shut down permanently, they enter a decommission process which will lead to the release of the site for unrestricted uses. Specifically, decommissioning a nuclear power plant can be defined as the cessation of operations and the withdrawal of the facility from service, followed by its transformation into an out-of-service state and eventually, its complete removal. Decommissioning activities are intended to place the nuclear facility in a condition that provides for the health and safety of the general public and the environment, while at the same time protecting the health and safety of the decommissioning workers.

Decommission begins when operations at a nuclear power plant are terminated. In most cases, the nuclear fuel, the mobile radioactive materials in the process systems, and the radioactive waste produced during normal operations are removed as soon as the plant ceases to operate. Certain equipment can also be removed and discarded. If the entire facility were to be dismantled immediately, however, the decommissioning workers would be exposed to higher levels of radiation than if the dismantlement were to be accomplished in several steps. Therefore, decommissioning activities have been divided into three stages. Each of these stages can be defined by two characteristics: the physical state of the plant and its equipment, and the surveillance needed to maintain that physical state.

Stage 1 decommissioning entails removing the spent fuel from the reactor, draining the liquid systems, disconnecting the operating systems, blocking and sealing the mechanical openings such as valves and plugs, and controlling the atmosphere inside the containment building. The facility is kept under surveillance, access is limited and routine inspections are carried out to assure that the plant remains in a safe condition.

Stage 2 decommissioning requires all equipment and buildings which can be easily dismantled to be removed or decontaminated and made available for other uses, leaving only the reactor core structure and its extensive shielding. The containment building and the ventilation system may be modified or removed if they are no longer needed for safety reasons, or they may be decontaminated to allow access for other purposes. Other buildings and equipment which are not radioactive may be converted for new purposes as well. Surveillance during Stage 2 is reduced, but it is desirable to continue periodic spot checks of the buildings as well as surveillance of the surrounding environment.

Stage 3 decommissioning requires that, unless the site, buildings or equipment are to be re-used for other nuclear purposes, all materials with radioactivity levels exceeding those closely equivalent to the natural radiation environment will be removed and the site released without restrictions or further surveillance.

These three stages may be carried out by rapidly progressing from one stage to the next or carried out over a prolonged period lasting as long as 100 years or more. Although most facilities intend to complete all three stages, a facility could remain at Stage 1 or Stage 2 for a relatively long period of time, or decommissioning could proceed directly from Stage 1 to Stage 3.

According to the NRC, however, decommissioning must be completed within 60 years of permanent cessation of operations. In contrast, conservation groups such as the Sierra Club lobby for a 30 to 50 year completion time-frame. However, some decommissioning tasks cannot begin immediately after plant cessation. For example, current dry storage cask designs are licensed for spent fuel with a core discharge decay time averaging approximately five years or longer. Therefore, decommissioning operations for the plant's "fuel building" cannot be expected to begin prior to five years after the cessation of plant operations.

One open question regarding NRC licensing relates to possible deregulation of the nuclear power industry. Deregulation may cause some NRC licensees to cease being an "electric utility", as defined in NRC regulations. If this occurs, the NRC will require the licensees to meet more stringent decommissioning funding assurance requirements that apply to non-electric utilities. Further, NRC is considering revising its financial and decommissioning funding assurance requirements.

Acceptable Decommissioning Alternatives

Decommissioning involves three different alternatives: DECON, SAFSTOR, or ENTOMB. Under DECON (immediate dismantlement), shortly after the nuclear facility closes, equipment, structures, and portions of the facility containing radioactive contaminants are removed or decontaminated to a level that permits release of the property and termination of the NRC license. Note that the required work force during DECON is one-third to one-tenth the required number of people employed during normal operations. As is evident, the work force and associated costs are high.

Under SAFSTOR, often called "delayed DECON," a nuclear facility is maintained and monitored in a condition that allows the radioactivity to decay; afterwards, the nuclear facility is dismantled. For example, if a new plant is built next to an existing plant, then this will enable the existing plant to go into SAFSTOR upon license expiration. The personnel that operate the new plant will be able to look over the SAFSTOR plant without incurring significant costs. Therefore, decommissioning the plant after SAFSTOR will lower the cost of decommissioning. It follows that if new nuclear power plants are ever built, it would be likely that they would be built next to existing facilities. This may allow the older facilities to be placed into SAFSTOR at little cost.

Under ENTOMB, radioactive contaminants are encased in a structurally sound material such as concrete and appropriately maintained and monitored until the radioactivity decays to a level permitting release of the property. ENTOMB is not presently allowed by NRC regulations but is under consideration as a possible option.

A licensee may also choose to adopt a combination of the first two alternatives in which some portions of the facility are dismantled or decontaminated while other parts of the facility are left in SAFSTOR. The decision may be based on factors besides radioactive decay such as availability of waste disposal sites. However, most facilities will use either immediate DECON or a DECON after some period of SAFSTOR.

As stated, under NRC regulations, decommissioning must be completed within 60 years. A time beyond that will be considered only when necessary to protect public health and safety in accordance with NRC regulations.

Actual Decommissioning Experience

As of January 1998, there have only been five plants that have completed the DECON process, three nuclear power plants, and two Department of Energy ("DOE") plants. Further, six nuclear power plants are now in various stages of dismantlement and decontamination and eleven nuclear power reactors are currently in long term storage (SAFSTOR).

Decommissioning Cost Estimates

The total cost of decommissioning is dependent on the sequence and timing of the various stages one through three, described above. Deferment of a stage tends to reduce its cost, due to decreasing radioactivity, but this may be offset by increased storage and surveillance costs.

Even allowing for uncertainties in cost estimates and applicable discount rates, decommissioning contributes less than 5% to total electricity generation costs. In the United States, many utilities have revised their cost projections downwards in the light of experience, and estimates from 1998 now average $325 to $500 million per reactor and up.

Financing methods vary; however, the most common methods are:

Prepayment: Money is deposited in a separate account to cover decommissioning costs even before the plant begins operation. This may be done in a number of ways but the funds cannot be withdrawn other than for decommissioning purposes.

External sinking fund (Nuclear Power Levy): A fund is built up over the years from a percentage of the electricity rates charged to consumers. Proceeds are placed in a trust fund outside the utility's control. This method is the main method in the United States, where sufficient funds are set aside during the reactor's operating lifetime to cover the cost of decommissioning.

Surety fund, letter of credit, or insurance: Purchased by the utility to guarantee that decommissioning costs will be covered even if the utility defaults.

In the United States, utilities generally collect 0.1 to 0.2 cents per kW-hour to fund decommissioning. They must then report regularly to the NRC on the status of their decommissioning funds. As of 1998, $22.5 billion of the total estimated cost of decommissioning all U.S. nuclear power plants had been collected, leaving a liability of about $9.5 billion to be covered over the operating lives of 103 active reactors.

Further, in accordance with NRC regulations, decommissioning cost estimates are required at five different periods, which are:

1) at the time of NRC licensing,
2) five years before anticipated shutdown,
3) with a Post-Shutdown Decommissioning Activities Report (PSDAR) submittal,
4) two years following shutdown (this is the first time that the cost estimate has to be site specific, prior to this the facility could use estimates from similar sites as their basis), and
5) two years preceding the anticipated termination of the license.

Note that decommissioning costs do not include the cost of removal and disposal of spent fuel or of non-radioactive structures and materials beyond that necessary to terminate the license.

Nuclear Decommissioning Trusts

As should be appreciated, nuclear facilities have extraordinary costs at the end of their lives. By NRC regulation, these costs must be collected and managed during the life of the facility, creating several valuation issues. As the term of its license ends, a nuclear facility will be decommissioned and radioactive portions safely removed or contained. As stated, typical decommissioning costs for nuclear facilities approach $500 million dollars per reactor, based on NRC minimum facility funding for a large nuclear unit. Although funding depends on unit size, and other factors, these current dollar estimates for decommissioning costs and the future cost could be triple this estimate, or more, by the end of a typical full life of these facilities.

By regulation, the dollars collected for decommissioning are periodically deposited into an externally managed investment fund or trust (external sinking fund), discussed above, and kept separate from an owner's other assets. The objective is to accrue an amount that is sufficient to pay for decommissioning costs as of the termination date of the facility.

Two types of trust funds can be used to accrue amounts for decommissioning: a qualified trust fund and a non-qualified trust fund. The non-qualified trust fund receives no special tax treatment, whereas the qualified trust fund is provided special timing considerations and tax benefits. Internal Revenue Code Section 468A allows for the establishment of qualified trust funds.

Under the qualified trust funds, contributions to these funds are immediately deductible in computing taxable income. Although any revenue that may be received specifically for decommissioning is included in taxable income, the contributions to a qualified trust fund are immediately deductible as an offset. The net effect is that no taxable income will be recognized until expenditures are actually incurred for decommission, at which time actual decommissioning costs are treated as deductible expenses. This tax method has the advantage of recognizing revenues during the same future tax-period that the expense will be incurred.

In contrast, contributions to non-qualified trust funds are treated as income during the tax period earned and therefore are not immediately deductible. Thus, while amounts collected from customers are included in taxable income, the contribution to a non-qualified trust does not offer a current tax deduction. Consequently, non-qualified funds collected from customers need to include a "gross up" for taxes, to allow sufficient after-tax amounts to fund the trusts.

The income earned by the funds is also subject to different tax rates. Qualified funds are subjected to a 20% federal tax rate. The non-qualified funds are taxed at the federal tax rate, which currently is typically 35%. Although it is advantageous to maximize contributions to a qualified fund, the amount that is allowed for deposit into a qualified trust fund is restricted by rules governed by the state regulatory commission and the Internal Revenue Service.

Any amounts withdrawn from a qualified fund are taxable during the tax period of the withdrawal. For the non-qualified fund, however, there is no taxable income recognition on withdrawal from the funds because no tax deduction had been allowed on the original contribution. A tax deduction for the actual decommissioning costs expended is taken for both types of funds during the tax period of the expenditure. Therefore, to the extent that money withdrawn from a qualified fund is used to meet decommissioning expenses, there will be an equal offset between revenue and expenses for the tax period.

For example, NISA Investment Advisors, L.L.C. ("NISA") manages $2.4 billion in fixed income and equity portfolios for twenty-one Nuclear Decommissioning Trust clients. NISA has estimated that the total qualified decommissioning trust has $16.3 billion in assets while the total non-qualified decommissioning trust has $5.6 billion.

Equity allocations in qualified trusts and non-qualified trusts continue to grow with target allocations of 55% for both trusts. Currently, the qualified trusts equity allocation is 48% of assets, while the non-qualified equity allocation is 56% of assets. NISA expects 1999 total contributions to qualified decommissioning trusts to be $1,074 million, and $356 million for non-qualified trusts. In addition, 58% of the investor owned nuclear decommissioning trusts are subject to state income taxes. The median state tax rate is 7.8%, where the maximum is 12.8% and the minimum is 2.0%. NISA published after-tax asset returns for investor owned decommissioning trust in 1998 are:

|  | Nominal | Real* |
| --- | --- | --- |
| Qualified | 6.7% | 2.5% |
| Non-Qualified | 6.2% | 1.8% |

*Estimated real returns are the difference between sponsors' nominal return and inflation assumptions.

A 1998 study conducted by NISA indicated the following factors that contribute to the uncertainty of funding of the decommissioning liability, according to owners. These factors are (ranked by degree of uncertainty):

Waste Disposal Cost Inflation

Regulatory Environment

Asset Returns

Early Decommissioning

Deregulation

Labor Cost Inflation

Energy Cost Inflation

Method of Decommissioning

Nuclear Decommissioning Inflation

NRC licensees are required to annually adjust the amount of decommissioning funding assurance based on inflation estimations. For example, decommissioning cost inflation assumptions declined by 40 basis points ("bps") over the past two years, slightly less than the decline in the Consumer Price Index ("CPI").

According to NISA, the inflation average rate is 4.3% with a median rate of 4.1% and a standard deviation of 1.3%. A 1999 study conducted by NISA indicated that the average inflation assumption for waste burial costs, accounting for 22% of total decommissioning costs, were 9.9%. Adjustments by licensees are either based upon a revised decommissioning estimate or by using the following inflation adjustment factor (set for by the NRC):

$$0.65L + 0.13E + 0.22B$$

where L=Labor escalation factor

E=Energy and transportation escalation factor

B=Escalation factor for waste burial

Correlation of Decommissioning and CPI Inflation

As part of the CPI, Labor and Energy costs are naturally correlated therewith. Although, low level waste may not be correlated with the CPI, based upon the above formula, the annual low-level waste inflation would need to be 27% in order to have the total decommissioning inflation be 6.0% above CPI.

The costs for low-level waste disposal are determined by market conditions of the demand for the disposal of low-level waste and the supply capacity of facilities that can accept the low-level waste. Currently, there are only three facilities that are licensed to accept low level waste: Barnwell (in South Carolina), Hanford (in Washington), and Clive (in Utah). Historical escalation of low-level waste has been higher than CPI escalation; however, for the following reasons, this may not be the case in the future:

1. The Federal government has stated that it is the individual state's responsibility to dispose of the low-level radioactive waste. The states have formed eleven compacts to date where the states within each compact will work together to decide upon, where to develop new disposal facilities that could be used for all of the states within that compact. There will be economic pressure on the states to develop their own disposal sites if the low-level disposal costs continue to escalate, or as the existing facilities reach their waste capacity.

2. Rapidly increasing fees for disposal of low-level waste have spawned the creation of a niche market for firms specializing in the management of low-level waste. Since these firms are controlling the low level waste disposal of several companies, they are in a better position to negotiate disposal fees. These firms also specialize in volume reduction or waste treatment so that the waste could be disposed of in solid waste landfills.

3. Efficiencies in decommissioning should be studied as more and more nuclear power plants go through decommissioning.

Decommissioning Financial Assurance Requirements

An NRC licensee may take credit for projected earnings on the prepaid decommissioning trust funds using a 2% annual real rate of return from the time of future funds' collection through the projected decommissioning period. This includes the periods of safe storage, final dismantlement, and license termination, if the licensee's rate-setting authority does not authorize the use of another rate. However, actual earnings of existing funds may be used to calculate future fund needs.

Insurance Requirements for Financial Assurance of Decommissioning

Any surety method or insurance used to provide financial assurance must be open-ended, or if written for a specific term, must be renewed automatically. The exception is if ninety days or more preceding the renewal date, the issuer notifies the Commission, the beneficiary, and the licensee of its intent to not renew. The surety or insurance must also provide that the full amount be paid to the beneficiary, automatically preceding the expiration date without proof of forfeiture, if the licensee fails to provide a replacement acceptable to the Commission within thirty days after receipt of notification of cancellation. In addition, the surety or insurance must be payable to a trust established for decommissioning costs, and the trustee and trust must be acceptable to the Commission. The surety method or insurance must remain in effect until the commission has terminated the license.

Acceptable Payments for Decommissioning

The NRC licensee is permitted to use 3% of the generic amount of decommissioning funds, even while the facility is operating for engineering design, work package preparation, and licensing activities. After submitting the certification of permanent cessation of operations and the certification that the fuel has been removed from the reactor vessel, the licensee may use an additional 20% of the funds for any legitimate decommissioning activities. However, the licensee is prohibited from using the remaining 77% of the generic decommissioning funds until a site specific cost estimate is submitted to the NRC.

Further, the licensee must not perform any decommissioning activity that results in there no longer being reasonable assurance that adequate funds will be available for decommissioning.

Disposal of High-Level and Low-Level Radioactive Waste

During decommissioning, both high-level and low-level radioactive waste must be disposed of properly. High-level radioactive wastes are: (1) irradiated (spent) reactor fuel; (2) liquid waste resulting from the operation of the first-cycle solvent-extraction system, and the concentrated wastes from subsequent extraction cycles in a facility for reprocessing irradiated fuel; and (3) solids into which such liquid wastes have been converted.

The DOE became responsible for the permanent disposal capacity for spent fuel and other high-level nuclear wastes in the Nuclear Waste Policy Act of 1982. The DOE was suppose to be able to accept waste in 1998; however, the DOE is still investigating possible sites. Presently, Yucca Mountain in Nevada is under investigation as a possible disposal facility; however, it is not likely that this site will be available prior to 2015.

Although the DOE is responsible for the disposal of the spent fuel, the licensees are incurring significant costs in the construction and monitoring of the ISFSI (Independent Spent Fuel Storage Installation) which is required since the DOE is not ready to accept the spent fuel. This has created a tremendous amount of litigation where the licensees are suing the DOE. It is expected that this litigation may go on for several years.

Low-level waste is any radioactive waste that is not classified as high-level waste. As stated above, there are currently only three active licensed disposal facilities of low-level radioactive waste.

U.S. Price Anderson Act

The Price Anderson Act provides coverage for "any legal liability" arising from a "nuclear incident" with three specific exclusions: (1) worker's compensation claims for persons employed at the site in connection with the activity, (2) claims arising out of an act of war, and (3) damage to property at the site used in connection with the activities of the licensee. This last exclusion implies that the Price Anderson Act does not cover decommissioning costs.

Federal Statutes require reactor operators to maintain primary financial protection equal to the maximum amount of liability insurance available from private insurance sources at reasonable terms. See 10 C.F.R. §50.54(w).

The Act provides a three layered system of financial protection and indemnity agreements. In the first tier, licensees are required to provide proof of financial assurance protection in an amount equal to the maximum liability insurance available from private sources, currently $200 million. The second tier provides for a retrospective premium payment mechanism, whereby the industry would share liability for any damage resulting from a nuclear incident, currently $9.5 billion. In the event of such an incident, each commercial reactor licensee would be assessed a prorated share of damages up to the statutory maximum of $83.9 million per reactor per incident, but are limited to no more than $10 million annually per reactor per incident. In the third tier, the indemnity is guaranteed by the U.S. government.

Property Insurance

To meet the requirements of 10 C.F.R. §50.54(w), nuclear power plant licensees need to purchase the maximum coverage available. Currently, there are two levels of property insurance that provide coverage of post-accident stabilization and decontamination costs, "primary" and "excess" coverages.

For example, both American Nuclear Insurers ("ANI") and Nuclear Electric Insurance Limited ("NEIL") offer primary property coverage up to a limit of $500 million. ANI offers excess coverage in the amount of $600 million, and NEIL offers excess coverage in the amount of $2.25 billion. The combined amount of coverage available is at least $1.1 billion, and potentially as much as $3.85 billion in property insurance.

It is therefore an object of the present invention to provide a financial product and method for providing financial assurance for decommissioning a nuclear power plant using insurance.

Another object of the present invention is to provide a financial product, such as a decommissioning insurance policy, and method for receiving premiums from a trust, investing the received premiums, and paying actual decommissioning expenses back to the trust.

A further object of the present invention is to provide a financial product and method for accurately determining the premium of the financial product independent of the actual year decommissioning begins.

Various other objects, advantages and features of the present invention will become readily apparent from the ensuing detailed description and the novel features which will be particularly pointed out in the appended claims.

SUMMARY OF THE INVENTION

The present invention is directed to an insurance policy and insurance method wherein an insurance company agrees to pay on behalf of an insured (e.g., a qualified or non-qualified nuclear decommissioning trust) the decommissioning costs incurred by the insured which occur after a policy inception date and before a policy termination date that are required to decommission one or more nuclear power plants.

In one embodiment, an insurance policy provides financial assurance for the decommissioning of a nuclear power facility. The policy provides, in exchange for payment of a premium, for an insurer to pay actual decommissioning expenses for the nuclear power facility between a policy inception date and a policy termination date. As an aspect of this embodiment, the insurer will invest the received premium in, e.g., securities, and will use the accrued value of the premium to pay the actual decommissioning expenses in accordance with the terms of the policy.

In another embodiment, an insurance policy, issued by the insurer, such as an insurance company, for decommissioning a nuclear power facility, includes a monetary premium that is determined based on a plurality of scenarios. Each scenario is based on the decommission starting on a different time schedule, e.g., by year, where each scenario has a monetary sum of estimated expenses and risk.

The premium is based on an adjusted sum of the scenarios, where the adjusted sum is determined by 1) determining a net present value (NPV) of expected decommissioning expenses for each scenario, 2) by determining a risk transfer element for each scenario, where the risk transfer element is an NPV of unexpected expenses multiplied by a probability of actual occurrence, and 3) by determining insurer expenses for each scenario, where the insurer expenses are an NPV of expected expenses incurred by an insurer of the nuclear facility. The above three NPVs are then added for each scenario, to calculate the monetary sum of each scenario. The monetary sum of each scenario is then adjusted, so that each monetary sum is substantially equal to one another. The premium of the insurance policy is based on the adjusted sum. As an aspect of this insurance policy, an insurance profit value is added to the adjusted sum to obtain the premium. Note that all of the above is preferably performed by a computerized system.

In addition, the inventive financial products advantageously offer tax efficiencies. For example, regarding tax implications of transferring non-qualified trust funds when a nuclear power plant is sold, the inventive financial products and methods provide tax efficiencies on the transfer of such non-qualified funds.

Further, under the existing decommissioning trust accounts, the contributions to the qualified trust fund accounts should be tax deductible when paid into the trust, while the contributions to the non-qualified trust fund accounts may need to wait until the actual decommissioning costs are paid out before a deduction may be taken. Under the inventive financial products and methods, the entire premium payment may be tax deductible when paid.

In addition, regarding interest income, under the existing decommissioning trust accounts, the qualified trusts are taxed at a 20% rate, while the non-qualified accounts are taxed at the corporate rate (typically 35%). Under the inventive financial products and methods, the interest income will be earned in a tax deferred environment, from the insured's prospective.

Further, the insured will have better ability to access funds. The inventive financial products may be set up to pay for maintenance of the facility, while providing adequate coverage for decommissioning.

As another advantage, the inventive financial product may be AAA rated. Such a AAA rating is very important to the NRC, since the companies that are looking at acquiring the nuclear power plants are generally private companies (not utilities). The NRC will want to make sure that a financially strong company is providing the financial assurance.

In addition, the inventive financial product provides financial assurance to the seller of a nuclear power plant that the decommissioning obligations are secured. The seller may also require the potential buyer to demonstrate that money will be available for the ultimate decommissioning.

As yet another advantage, the inventive financial product may be set up to allow the owner of several plants to pool their exposure.

Such advantages listed above are merely illustrative and not exhaustive. Further, these and other features and advantages of the present invention will become more apparent from the accompanying drawings and the following detailed description.

BRIEF DESCRIPTION OF THE DRAWINGS

The following detailed description, given by way of example and not intended to limit the present invention solely thereto, will best be understood in conjunction with the accompanying drawings in which:

FIG. 1 schematically illustrates the process of providing insurance for decommissioning a nuclear power plant, in accordance with the present invention.

FIG. 2A schematically illustrates a plurality of scenarios for decommissioning a nuclear power plant, in accordance with the present invention.

DETAILED DESCRIPTION OF THE INVENTION

Figure 2B:
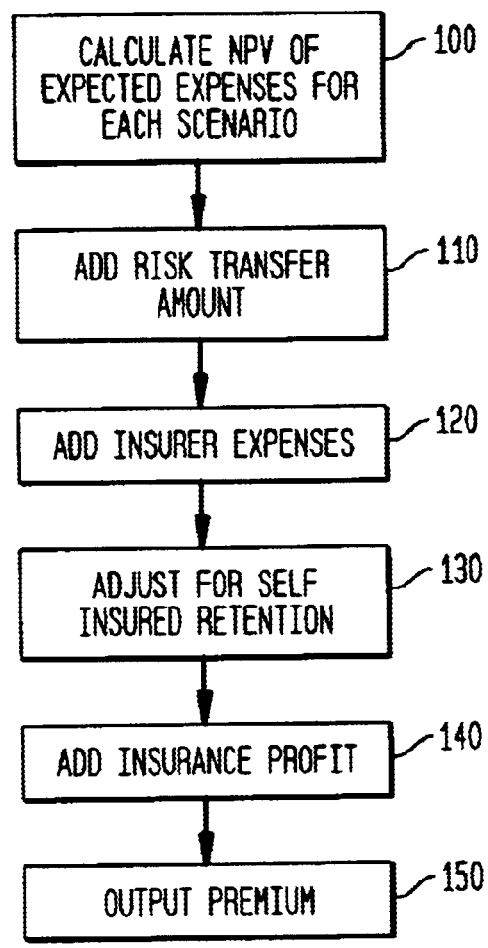
FIG. 2B is a flow chart of a process for calculating a premium for an insurance policy for decommissioning a nuclear power plant, in accordance with the present invention.

FIG. 1 schematically illustrates the use of an insurance policy to provide financial assurance for decommissioning a nuclear power plant, according to the present invention.

As shown in step 1 of FIG. 1, an insurance company 10 delivers an insurance policy 12 to cover the costs of nuclear power plant decommissioning. As an example, insurance policy 12 may include several items, such as the name and address of the insured, the policy period (policy inception date and policy termination date), the covered locations(s), the limit of liability, the self-insured retention, co-insurance participation percentage, and policy premium. An example of insurance policy 12 is described below. Illustratively, the insurance policy is held by a nuclear decommissioning trust 14. As shown, the trust 14 may be a qualified or non-qualified trust.

In step 2, the trust, in turn, delivers a one-time premium payment 16 (or alternatively a time sequence of premium payments, not shown) to insurance company 10. An illustrative computer implemented method for calculating the premium is described below in connection with FIGS. 2A, 2B, and 3, described in detail hereinbelow.

In step 3, the insurance company invests the premium in financial instruments, such as securities 18 and commodities, which are chosen according to conventional techniques. For example, securities 18 may include zero coupon bonds and Treasury Inflation Protected Securities (TIPS). The investments are structured so that funds for decommissioning expenses are available at the appropriate times.

In step 4, at an appropriate time according to a decommissioning plan, the insurance company pays to the policy holder the decommission expenses 20 including any unexpected decommissioning expenses within the limits of the insurance policy. Payments may be made for each actual decommissioning expense. For example, payments may be made during each of the three stages described heretofore, where the first stage includes a time period for removing spent fuel and disconnecting operating systems from the nuclear facility, the second stage includes a time period for dismantling all equipment and buildings of the nuclear facility, except a reactor core and its shielding, and the third stage includes a time period removing all materials with radioactivity levels above a predetermined limit. The time sequence of payments will be set forth in insurance policy 12.

In step 5, the actual decommissioning of the plant 22 commences.

Figure 3:
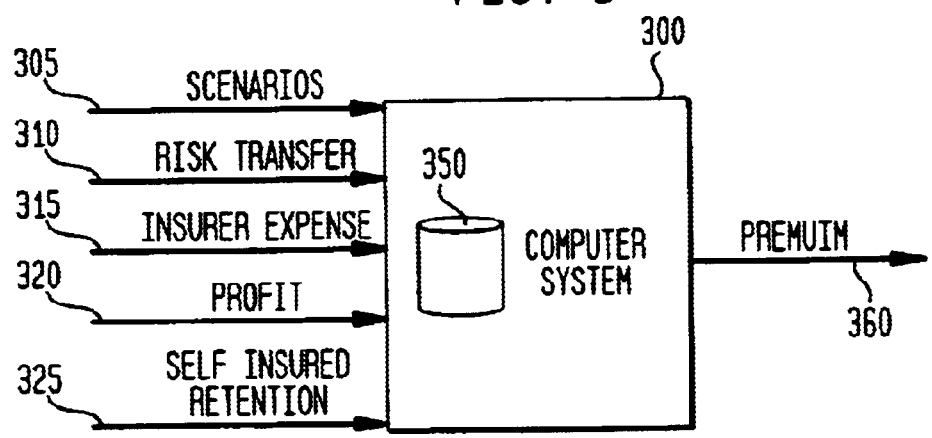
FIG. 3 schematically illustrates a computer system used to calculate the premium according to the process of FIG. 2B, in accordance with the present invention.

FIGS. 2A, 2B and 3 illustrate how the premium of the insurance policy is determined. FIG. 2A shows a plurality of decommissioning plans or scenarios for a particular nuclear power plant. For both new and existing decommissioning insurance policies, typically neither the insurer nor the facility know the precise year that decommissioning will take place. Of course, the cost for decommissioning, as well as the cost estimates of such decommissioning, will change depending on when (e.g., in what year) the decommission begins. Generally, the costs will increase each year decommissioning is delayed. For this reason, the inventive method provides that a plurality of "scenarios" be included in the insurance financial product (i.e., in the insurance policy), where each scenario is based on the decommission starting, e.g., in a different year. In this manner, the premium may be accurately determined, as set forth below.

As shown in FIG. 2A, each scenario is a sequence of expected annual dollar payments for the decommissioning expenses, and each scenario has a different start year. Thus, scenario 1 starts in year 1, scenario 2 starts in year 2, and scenario N starts in year N.

FIG. 2B illustrates an exemplary flow-chart of the method for determining the premium using scenarios as discussed above. As stated, each scenario contains a set of "expected annual expenses" related to the decommission starting from the year the decommission starts in the particular scenario, which can be expressed as the net present value ("NPV") of the expected expenses. Further, each scenario includes a set of "risk transfer" values and "expenses to the insurer" values, which can both be represented in NPV terms as well. Note that the NPV of each are determined in monetary values.

To determine the risk transfer value for each scenario, it is determined in NPV how much risk, above the expected decommission payments, is transferred to the insurer. Usually, the amount of risk transferred is above a floor amount and below a ceiling amount. Specifically, for each scenario, the NPV of the risk transfer is unexpected expenses, in each year, weighted by a probability of actual occurrence. As will be described below, the net present value of the risk to be transferred to the insurer is added to the net present value of the stream of expected decommissioning payments described above.

To determine the insurer expenses for each scenario, the expenses that the insurer will incur in connection with the decommission are determined. For example, such expenses may be monitoring programs, engineering expenses, taxes, etc. As will be described below, the net present value of these expected expenses is added to the sum of the expected NPV and risk NPV.

Referring to FIG. 2B, in step 100, the NPV of the expected expenses for decommissioning of each scenario is determined. Thus, there is obtained for each scenario the NPV of the expected decommissioning expenses. This is the first element in the premium.

In step 110, the NPV of the risk transfer of each scenario is added to each respective NPV of the expected expenses of each scenario. As stated, the risk transfer value is an amount above the expected decommissioning expenses for which the insurance company will be responsible if events require such expenses to be incurred. Note that scenarios having different risk transfer levels will have different NPVs of the risk transfer. This is the second element in the premium.

In step 120, the NPV of insurer expenses, such as monitoring costs, engineering expenses, and taxes, is determined and added to each scenario, respectively. This is the third element in the premium. These three NPV elements, added together, may be referred to as the "monetary sum" for each scenario.

It should be noted that the monetary sum for each scenario will generally be different for each scenario. In order to arrive at a single premium value, the sums for the different scenario are equalized, in accordance with the present invention. This is accomplished by adjusting (e.g., subtracting) each monetary sum by a "self-insured retention" value for each scenario. The self-insured retention represents the amount of self insurance provided by the insured party for each scenario. By providing a self insurance retention value separately for each scenario, the sums described above may be equalized across all the scenarios, so that there is a single premium for all scenarios in the insurance policy. The self insured retention value schedule is usually attached to the insurance policy, as indicated above with reference to insurance policy 12.

Accordingly, in step 130, all monetary sums (for each scenario) are made equal by adjusting the monetary sums by a respective self-insured retention. Thus, an adjusted sum, which is substantially the same for each scenario, is obtained.

In step 140, an "insurer profit" is added to the adjusted sum to arrive at the premium (step 150). The profit is an amount determined by the insurer and agreed to by the insured. Because the premium is invested on behalf of the insured (i.e., the trust) in step 3 of FIG. 1, the insurer does not profit from either the premium payment (absent the added insurer profit) or the interest accrued therefrom. As stated, these are used to pay the decommissioning expenses.

Illustratively, the process of FIG. 2B may be implemented by a computer system 300, shown in FIG. 3. Generally, computer system 300 will have a local hard drive 350 that stores a software program to compute the premium as set forth in FIG. 2B. Such software program may be written in any desired programming language, such as C++ or Java. In addition, the software program may be located at a remote server across the Internet or over a dedicated line (not shown). Further, the process of FIG. 2B may be implemented in hardware or firmware (not shown). As illustrated, the input to the computer system 300 are the scenarios 305, risk transfer amounts 310, insurer expenses 315, insurer profit 320, and self-insurer retention 325. The output of computer 300 is the premium 360.

It should be appreciated that the above financial product and method of utilizing the insurance policy to provide financial assurance, as well as the above financial product and method of determining the premium, is equally applicable to new and existing decommissioning insurance policies. For example, existing policies that are currently in effect may be converted to the inventive decommissioning insurance policy.

An example of insurance policy 12 is now set forth:

---

NUCLEAR DECOMMISSIONING INSURANCE POLICY.
DECLARATIONS

POLICY NUMBER:
Item 1: NAMED INSURED:
   ADDRESS:
Item 2: POLICY PERIOD: (a) POLICY INCEPTION DATE:
   (b) POLICY TERMINATION DATE:
   (12:01 A.M. standard time at the address stated in Item 1.)
Item 3: COVERED LOCATION(S):
Item 4: LIMIT OF LIABILITY:
Item 5: SELF INSURED RETENTION:
Item 6: CO-INSURANCE PARTICIPATION PERCENTAGE:
Item 7: POLICY PREMIUM:
Broker: _____

_____
Authorized Representative

---

Summary of Coverage

Refer to Policy Terms for Complete Coverage Information

The coverage provided by this policy is for "Decommissioning Costs" as defined in Section II. This policy has certain provisions and requirements unique to it and may be different from other policies the Named Insured may have purchased. The policy requires that the "Decommissioning Costs" be first incurred by the Named Insured during the policy period and reported in writing to the Company during the same policy period.

Various provisions throughout this policy restrict or exclude coverage. Please read this entire policy carefully.

Terms appearing in boldface are defined in Section II of this policy.

Nuclear Decommissioning Insurance Policy

In consideration of the payment of the premium listed under Item 7 of the Declarations, in reliance upon the statements in the Declarations and Application made a part hereof and subject to all terms of this policy, the Company agrees with the Named Insured as follows:

Section I. Insuring Agreement

The Company agrees, subject to the terms, conditions and limits of this policy, to pay on behalf of the Insured, the Decommissioning Costs the Insured first incurs on or after the Policy Inception Date and before the Policy Termination Date, which are required to Decommission the Covered Location(s).

Section II. Definitions

A. Application means the submission and application and other materials submitted by the Insured to the Company in connection with the issuance of this Policy, including without limitation, the Decommissioning Plan, the PASDAR and [LIST OTHERS].

B. Bodily Injury means physical injury, or sickness, disease, mental anguish or emotional distress whether or not accompanied by physical injury, sustained by any person, including death resulting therefrom.

C. Co-Insured Participation means the percentage of Decommissioning Costs the Insured must bear in excess of the Self-Insured Retention as shown in Item 6 of the Declarations.

D. Covered Location(s) means the Nuclear Power Station designated in Item 3 of the Declarations.

E. Decommission or Decommissioning means the safe removal of a facility from service and reduction of residual radioactivity to a level that permits termination of the NRC license under an Unrestricted use or a Restricted use standard.

F. Decommission Costs means reasonable and necessary costs, charges and expenses incurred for Decommissioning as described in the Decommissioning Plan. However, Decommissioning Costs do not include:

1. Costs, charges or expenses incurred for litigation, arbitration or other form of dispute resolution in any way related to or in connection with Decommissioning, including fees of attorneys, consultants, investigators, adjusters and experts, unless otherwise expressly consented to in writing and in advance by the Company; or 2. Costs for SAFSTOR or ENTOMB unless otherwise expressly consented to in writing and in advance by the Company; or 3. Transportation and disposal costs of High Level Wastes.

G. Decommissioning Plan means the documentation attached to and forming part of this policy, which describes the Decommissioning activities to be undertaken at the Covered Location.

H. Decontamination means any action taken following a Nuclear Incident to reduce the levels of radioactivity present at the Covered Location or its environs to those allowable under 10 C.F.R. Part 20, including without limitation those actions identified in 10 C.F.R. §50.54 (w)(4)(ii).

I. ENTOMB means the following method of Decommissioning: radioactive structures, systems, and components are encased in a structurally long-lived substance, such as concrete. The entombed structure is appropriately maintained, and continued surveillance is carried out until the radioactivity decays to a level that permits termination of the license.

J. High Level Wastes means (1) irradiated (spent) reactor fuel; (2) liquid waste resulting from the operation of the first-cycle solvent -extraction system, and the concentrated wastes from subsequent extraction cycles in a facility for reprocessing irradiated fuel; and (3) solids into which such liquid wastes have been converted.

K. Insured means the Named Insured or Additional Insured, and any director, officer, partner or employee thereof while acting within the scope of his/her duties as such.

L. Named Insured means the person or entity designated as such in Item 1 of the Declarations.

M. NRC means the Nuclear Regulatory Commission, or any governmental agency or body that shall succeed to its functions.

N. Nuclear Incident means any occurrence causing loss of or damage to property, arising out of or resulting from the radioactive, toxic, explosive, or other hazardous properties of source, special nuclear, or byproduct material (as those terms are defined in 10 C.F.R. §50.2) present at the Covered Location.

O. Policy Inception Date has the meaning given in Item 2(a) of the Declarations.

P Policy Period has the meaning given in Item 2 of the Declarations.

Q. Policy Termination Date means the earliest of the following:
  1. The date set forth in Item 2(b) of the Declarations;
  2. The date on which the Limit of Liability shown in Item 4 of the Declarations is exhausted; or
  3. When the Insured receives written approval from the NRC and the State Regulatory Agency that Decommissioning has been completed.

The Policy Termination Date shall not be extended by the exercise of any rights held by a governmental entity to reopen, reconsider or otherwise cause the Insured to perform Decommissioning after previously having approved or acknowledged that Decommissioning has been completed at the Covered Location.

R. Property Damage means the physical injury to or destruction of real or personal property, other than Decommissioning Costs covered under this policy, including:
  1. the resulting loss of use thereof,
  2. loss of use of real or personal property that has not been physically injured or destroyed; or,
  3. diminution in value of real or personal property or any other economic or consequential loss.

S. PASDAR means a post-shutdown decommissioning activities report.

T. Restricted Use means that the licensee has demonstrated that further reductions in residual radioactivity would result in net public or environmental harm or residual levels are as low as is reasonably achievable, and the licensee made provisions for legally enforceable institutional controls (e.g., restrictions placed in the deed for the property describing what the land can and cannot be used for), which provide reasonable assurance that the radiological criteria set by the NRC will not be exceeded.

U. Self-Insured Retention means the amount of Decommissioning Costs stated in Item 5 of the Declarations which the Insured has retained for its own account and which are characterized as a self-insured retention.

V. Unrestricted Use means that there are no restrictions on how the site may be used.

Section III. Exclusions

This Policy does not apply to Decommissioning Costs arising from or in any way in connection with:
  1. Any Bodily Injury;
  2. Any Property Damage;
  3. Any liability to any third-party for any reason whatsoever, other than for Decommissioning Costs otherwise covered under this policy;
  4. Any expense, charges or costs incurred by the Named Insured resulting from, relating to, or incurred in connection with, the Decontamination of the Covered Location following a Nuclear Incident.
  5. Any fines, penalties, interest payments, punitive damages, exemplary damages, statutory assessments or the multiplied portion of any multiplied damages imposed for violation of federal or state law;
  6. The Insured's intentional, willful or deliberate noncompliance with any federal or state statute, regulation, ordinance, administrative complaint, notice of violation, notice letter, executive order, or instruction of any governmental agency or body; any dishonest or criminal acts of any Insured. However, this exclusion does not apply to such noncompliance or acts which result in the necessity to Decommission.
  7. Any modification of the Decommissioning Plan made by the [Named] Insured, unless:
    a) Such modification is required by the governmental entity responsible for supervision of the Decommissioning; or
    b) The Company has consented to such modification in advance, in writing.

Section IV. Limit of Liability and Retention

The Company's total liability under this policy for all Decommissioning Costs in excess of the Self-Insured Retention shall not exceed its percentage of the Limit of Liability stated in Item 4 of the Declarations, regardless whether or not the Insured is financially unable, or is unwilling to pay its Co-Insurance Participation or its Self-Insured Retention. The Self-Insured Retention and Co-Insurance Participation are to be borne by the Insured and are not to be insured.

Section V. Rights of the Company and Duties of the Insured in Connection with Decommissioning 1. The Company shall have the right but not the duty to review, assess and inspect all aspects of any Decommissioning activities to which this policy applies, regardless of whether the Insured has incurred any Decommissioning Costs in excess of the Self-Insured Retention. Neither the Company's rights nor its exercise of its rights under this paragraph shall constitute an undertaking to determine or warrant that the Decommissioning is safe, healthful, or in conformity with applicable law.
2. The Insured shall take all reasonable and prudent steps to minimize the Decommissioning Costs. The Insured shall limit access to the Covered Location and prevent the spread of further contamination.
3. The Insured shall retain competent professional(s) or contractor(s) acceptable to the to undertake and complete Decommissioning.
4. The Insured shall include the Company on communications with the NRC dealing with Decommissioning. This communication would include, but not be limited to, the following:
  a) Copies of all Decommissioning Costs estimates, including copies of and amendments to the PASDAR; and, b) Annual reports on the status of Decommissioning funding.
5. The Insured shall cooperate with the, and at the Company's request, assist in obtaining information relative to any Decommissioning Costs hereunder. The Insured shall not, except at its own cost, voluntarily make or approve any payments, assume any obligations or incur any expense relating to Decommissioning which is not in accordance with the Decommissioning Plan.
6. The Insured shall keep detailed records of all Decommissioning Costs.
7. To the extent of the Insured's legal right of access, the Insured shall permit the Company to inspect the Covered Location, as often as the Company chooses after providing reasonable notice, and inspect all financial records, drawings, plans and specifications involved in the Decommissioning.
8. The Insured shall cooperate with the Company by providing the Company with:
   a) All information developed or discovered by the Insured concerning the Decommissioning, whether or not deemed by the Insured to be relevant;
   b) Free access to interview any agent, servant or employee of the Insured or any contractor or subcontractor involved in the Decommissioning;
   c) Any other information or other responses to reasonable requests from the Company concerning the Decommissioning.
0. The Insured shall submit any notices required by these conditions to:

or such other address as the Company may, from time to time, designate in writing.

Section VI. Sale or Transfer of Covered Location(s)

In the event that a Covered Location is sold, or if ownership or operational control is transferred by the Named Insured prior to the completion of the Decommissioning to which this policy applies, this policy shall remain in full force and effect, subject to its terms and conditions, only if:
1. The Company receives written notification at least forty-five (45) days prior to the effective date of such sale or transfer and consents, in writing, to the sale or transfer, which consent shall not be unreasonably withheld; and
2. The new owner or operator of the Covered Location agrees, in writing, to fully comply with all of the terms, conditions, duties and obligations of the Named Insured, which are set forth in this policy.

Section VII. Conditions

1. Cancellation—The Company shall not cancel this policy. The Company may elect to not renew this coverage, by notifying the [Named] Insured and the Commission of the NRC of its intent to not renew by sending, by certified mail, to the Named Insured at the address shown in this policy and to the NRC, written notice stating not less than 90 days or more preceding the renewal date. If the [Named] Insured is unable to provide the NRC with a replacement acceptable to the Commission then this policy will be renewed. The Named Insured may not cancel this policy without providing proof of alternative financial assurance acceptable by the NRC.
2. Declarations—By acceptance of this policy, the [Named] Insured agrees that the statements in the declarations and the Application are accurate and that this policy is issued in reliance upon the truth of such representations and that this policy embodies all agreements existing between the [Named] Insured and the Company or any of its agents relating to this insurance.
3. Assignment—Assignment of interest under this policy, whether to another individual, corporate entity with the same parent or a third party corporate entity, shall not bind the Company until its consent is endorsed onto this policy.
4. Subrogation—In the event of any payment under this policy, the Company shall be entitled to exercise rights of subrogation and the Insured shall execute and deliver instruments and papers and do whatever else is necessary to secure such rights. The Insured shall do nothing to prejudice such rights. The Company will act in concert with all other interested parties, including the Insured, concerned in the exercise of rights or recovery. The apportioning of any amounts which may be so recovered shall follow the principle that any parties, including the Insured, that shall have paid an amount over and above any payment hereunder shall first be reimbursed up to the amount paid by them. The Company is then to be reimbursed out of any balance then remaining up to the amount paid by it; lastly, the parties of whose interests this coverage is in excess, including the Insured, are entitled to claim the residue, if any. Expenses incurred in obtaining recoveries shall be apportioned among the interests sharing in such recovery in accordance with each such interest's proportionate share of the recovery.
5. Changes—Notice to any agent of the Company or knowledge possessed by any such agent or by any other person shall not effect a waiver or a change in any part of this policy or prevent the Company from asserting any right under the terms of this policy; or shall the terms of this policy be waived or changed, except by endorsement issued to form a part of this policy.
6. Sole Agent—The Named Insured first named in Item 1 of the Declarations shall act on behalf of all Insureds for the payment or return of premium, receipt and acceptance of any endorsement issued to form a part of this policy, giving and receiving notice of cancellation.
7. Changes.—Notice to any representative of the Insurer or knowledge possessed by any representative or by any person shall not effect a waiver or change in any part of this Policy; nor shall the terms of this Policy be waived, changed, modified or amended unless agreed to in writing by an authorized representative of the Insurer.
8. No Third Party Beneficiary.—This Policy shall not be deemed to give any right or remedy whatsoever to any third party unless said right or remedy is specifically granted to such third party by the terms hereof.
9. Waivers.—No waiver of any provision of this Policy shall be effective unless it be in writing and signed by a duly authorized officer of the Insurer and the Insured. The failure of the Insurer or the Insured to enforce any provision of this Policy shall not constitute a waiver by the Insurer or the Insured, as the case may be, of any such provision. Any past waiver of a provision by the Insurer or the Insured shall not constitute a course of conduct or a waiver in the future of that same provision.

Section VIII. Service of Suit

It is agreed that in the event of failure of the Company to pay any amount claimed to be due hereunder, the Company, at the request of the Insured, will submit to the jurisdiction of a court of competent jurisdiction within the United States. Nothing in this condition constitutes or should be understood to constitute a waiver of the Company's rights to commence an action in any court of competent jurisdiction in the United States, to remove an action to a United States District Court, or to seek a transfer of a case to another court as permitted by the laws of the United States or of any state in the United States. It is further agreed that service of process in such suit may be made upon Counsel, Legal Department, _____Insurance Company, or his or her representative, and that in any suit instituted against the Company upon this Policy, the Company will abide by the final decision of such court or of any appellate court in the event of any appeal.

Further, pursuant to any statute of any state, territory, or district of the United States which makes provision therefor, the Company hereby designates the Superintendent, Commissioner, or Director of Insurance, other officer specified for that purpose in the statute, or his or her successor or successors in office as its true and lawful attorney upon whom may be served any lawful process in any action, suit or proceeding instituted by or on behalf of the Insured or any beneficiary hereunder arising out of this contract of insurance, and hereby designates the above named Counsel as the person to whom the said officer is authorized to mail such process or a true copy thereof.

IN WITNESS WHEREOF the Company has caused this policy to be signed by its President and Secretary and signed on the Declarations page by a duly authorized representative of the Company.

| Secretary | President |
|-----------|-----------|

Of course, the above example of insurance policy 12 is only one of many examples. Further, it should be understood that the foregoing description is merely illustrative of the invention. Numerous alternative embodiments within the scope of the appended claims will be apparent to those of ordinary skill in the art.

What is claimed is:

1. A method for determining a premium of an insurance policy for decommissioning a nuclear power facility, comprising the steps of:

(a) determining a plurality of scenarios, wherein each scenario is based on said decommissioning starting on a different time schedule, and wherein each scenario has a monetary sum;

(b) determining a net present value (NPV) of expected decommissioning expenses for each said scenario;

(c) determining a risk transfer element for each said scenario, said risk transfer element being an NPV of unexpected expenses multiplied by a probability of actual occurrence;

(d) determining insurer expenses for each said scenario, said insurer expenses being an NPV of expected expenses incurred by an insurer of said facility;

(e) adding the monetary value of steps (b), (c), and (d), for each scenario, to calculate said monetary sum of each said scenario; and (f) adjusting said monetary sum of each said scenario, so that each said monetary sum is substantially equal, wherein said premium of said insurance policy is based on the adjusted sum and wherein at least one of steps (a)–(f) is performed with a computer.

2. The method of claim 1, wherein said step of adjusting comprises the step of subtracting an independent self-insured retention value from at least one said monetary sum to obtain said adjusted sum.

3. The method of claim 1, wherein said steps (a)–(f) are performed by the computer.

4. The method of claim 2, wherein if the value of each said monetary sum is different, then the value of each said independent self-insured retention value is also different.

5. The method of claim 1 further comprising the step of determining said premium based on the sum of said adjusted sum and an insurance profit value.

6. The method of claim 1, wherein said different time schedule is a successive year.

7. The method of claim 1, wherein said insurer expenses are at least one of monitoring costs, engineering expenses, and taxes.

8. The method of claim 1, wherein said self-insured retention is the amount of decommissioning costs that said facility has retained separate from said insurance policy.

9. The method of claim 1, wherein said insurance policy is an existing insurance policy between said policy inception and termination dates.

* * * * *